United States Patent [19]

Sisto

[11] Patent Number: 4,483,586
[45] Date of Patent: Nov. 20, 1984

[54] SAFETY SPACER

[75] Inventor: Konstantin Sisto, Tampere, Finland

[73] Assignee: Kommandiittiyhtiö B. Herrmans Kommanditbolag, Pedersöre, Finland

[21] Appl. No.: 445,570

[22] Filed: Nov. 30, 1982

[30] Foreign Application Priority Data

Dec. 8, 1981 [FI] Finland .................................. 813932

[51] Int. Cl.³ .......................... G42B 5/12; B64Q 1/32; B62J 5/24
[52] U.S. Cl. .................................. 350/97; 116/35 A; 280/289 R; 350/99
[58] Field of Search ................. 350/97, 99; 116/35 A, 116/173; 248/229, 230, 231.6; 280/289 R

[56] References Cited

U.S. PATENT DOCUMENTS 3,438,651  4/1969  Hertoghe et al. ..................... 350/97
4,321,883  3/1982  Ruppa ................................... 350/97

FOREIGN PATENT DOCUMENTS 2847415  5/1980  Fed. Rep. of Germany ........ 350/97

Primary Examiner—Bruce Y. Arnold
Assistant Examiner—William Propp
Attorney, Agent, or Firm—Schwartz, Jeffery, Schwaab, Mack, Blumenthal & Koch

[57] ABSTRACT

The invention relates to a safety spacer for a bicycle, having an arm one end of which has a reflector and the opposite end of which is fastened to a two-part split member by means of a shaft. The parts of the split member, when assembled, form a shouldered circular circumference. The safety spacer also comprises two fastening lugs which, when pressed together, form therebetween on the one hand a cavity with a shouldered circular circumference for receiving the parts of the split member and for attaching the same and on the other hand a circular aperture for attaching the safety spacer to a tube in a bicycle. The arm can be swiveled and pivoted freely, and all the parts of the safety spacer can be linked together and attached to a bicycle by means of one single screw.

5 Claims, 5 Drawing Figures

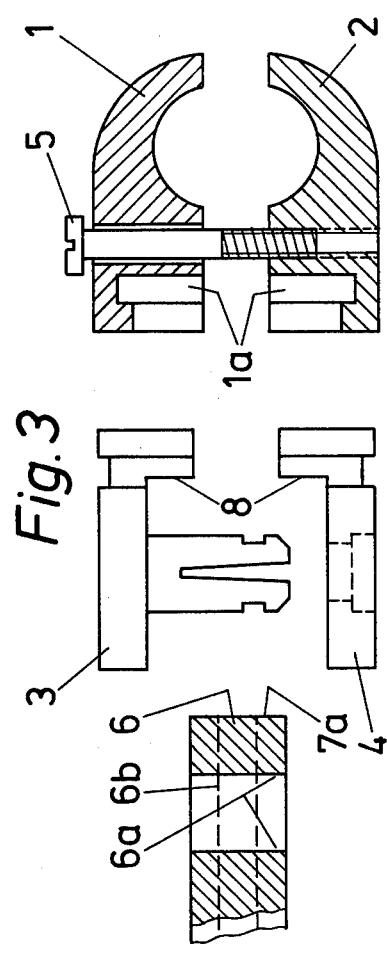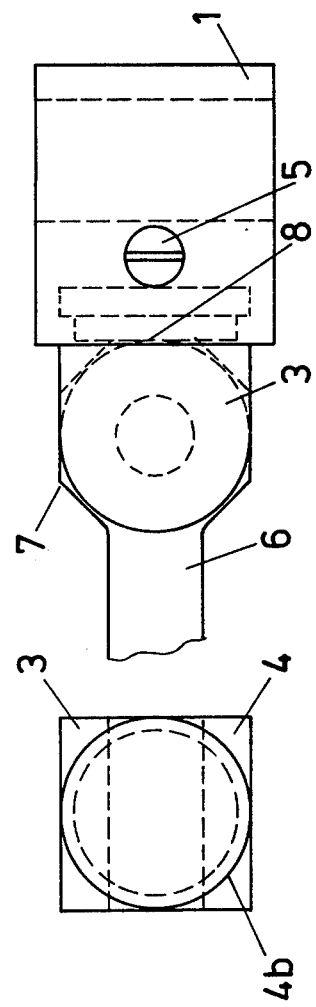

SAFETY SPACER

BACKGROUND OF THE INVENTION

Finnish Patent Application No. 793473 relates to a safety spacer comprising an arm at one end of which there is a flat reflector and at the opposite end a fastening device which allows the arm to be swiveled and pivoted and comprises a fastening member attachable to a bicycle and, connected to it, a swiveling articulation member to which the arm can be pivotably attached by means of a pivot shaft which is substantially plane parallel with the reflector.

In this known arrangement the articulation member consists of one angle piece to which the arm and the fastening member are attached at different points by means of swivel shafts in such a way that these shafts are perpendicular to each other. On the bearing surfaces between the angle piece and the fastening member there are shoulders radial in relation to the swivel shaft and grooves corresponding to the shoulders, in order to lock the parts so that they cannot swivel. The articulation between the angle piece and the arm is freely swiveling friction joint.

The disadvantages of the above-mentioned safety spacer, known from Finnish Patent Application No. 793473, include the facts that two screws or similar fasteners are required for fastening all the parts of the spacer to a bicycle and that the shoulders formed on the above-mentioned bearing surfaces are susceptible to mechanical wear. The fact that the joint between the angle piece and the arm loosens with time constitutes a further disadvantage.

SUMMARY OF THE INVENTION

The object of the present invention is to provide a safety spacer which is easy and rapid to fasten to a bicycle and which has a long useful life. A further object is to provide a safety spacer the arm of which can be turned to several different fixed positions.

This invention provides safety spacers having an arm; a flat reflector at one end of the arm; and means at the opposite end of the arm for attaching it to a bicycle, in which the means comprise: a pivot shaft, which is substantially plane parallel with the reflector; a split member comprising two parts adapted to receive the opposite end of the arm therebetween, at least one part having an aperture or depression for receiving the pivot shaft protruding from the opposite end of the arm or from the other part through an aperture in the opposite end, said parts, when assembled, having a shouldered circular circumference; and splittable fastening means comprising two fastening lugs forming therebetween a cavity with a shouldered circular circumference for receiving the parts of the split member and for attaching the same so that it can swivel.

DESCRIPTION OF THE DRAWINGS

FIG. 3 depicts the fastening device of FIG. 2, exploded, FIG. 4 depicts the fastening device of FIG. 2, as seen from above, and FIG. 5 depicts the joint part of the fastening device according to FIG. 2, as seen towards the arm.

DESCRIPTION OF THE PREFERRED EMBODIMENT

Figure 1:
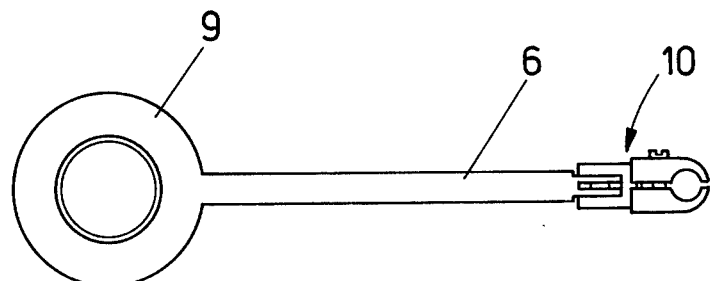
FIG. 1 depicts a side view of one spacer according to the invention.
Figure 2:
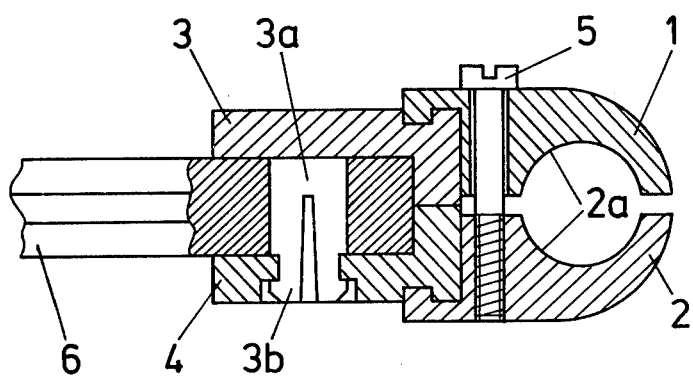
FIG. 2 depicts a longitudinal section, on an enlarged scale, of the fastening device of the safety spacer shown in FIG. 1.

The safety spacer includes an oblong, primarily bar-like arm 6, at one end of which there is a flat reflector 9 and at the opposite end a fastening device 10. The fastening device 10 comprises splittable fastening means 1, 2 to be fastened to a bicycle, and swivellably attached to said means a split member 3, 4, to which the arm 6 can be pivotably attached by means of a pivot shaft 3a. The pivot shaft 3a is substantially plane parallel with the reflector 9.

The split member comprises two parts 3, 4 adapted to receive the opposite end of the arm 6 therebetween. The shape of the parts 3, 4 depends on the structure of the opposite end of the arm 6. If there is a bearing aperture 6a at the opposite end of the arm, part 3 or 4 has a pivot shaft 3a, which is fitted through the bearing aperture 6a, and the other part 4 or 3 has an aperture or a depression for receiving the pivot shaft 3a. If, on the other hand, the opposite end of the arm has a pivot shaft 3a, each part 3, 4 has an aperture or depression for receiving the pivot shaft 3a. The pivot shaft 3a may also be a separate part which can be fitted through the bearing aperture 6a. In one preferred embodiment of the invention, there is a resilient lock 3b at the end of the pivot shaft 3a, and part 4 has an aperture or depression having a shoulder, in which case the lock 3b, when snapping over this shoulder, combines the parts 3, 4 and the arm 6 into one whole. If the pivot shaft 3a has two free ends, each of them may have a resilient lock 3b.

The fastening means comprise two fastening lugs 1, 2, which, when pressed together, form an aperture 2a therebetween for receiving a bar of the bicycle. If the diameter of such a bar is smaller than the aperture 2a, a resilient inner sleeve is used as an aid in fastening. The fastening lugs are fastened together by known fastening methods, preferably using screw fastening 5. The fastening means preferably comprise two separate fastening lugs 1, 2, but the fastening lugs 1, 2 may also comprise one piece made from a resilient material, in which case the aperture 2a is formed when the ends of this piece are pressed together.

The parts 3, 4 of the split member, when assembled, form a shouldered circular circumference 4b, and the fastening lugs 1, 2, when pressed together, form therebetween a cavity with a shouldered circular circumference 1a for receiving parts 3, 4 and for attaching the same swivellably. This outer surface 4b can be a flange or it can have a hemispherical or spherical shape, and the inner surface 1a has a corresponding shape.

One safety spacer according to the invention is attached to a bicycle, either to the carrier or anywhere else, to a horizontal, vertical or inclined tube as follows:

The shaft 3a of the part 3 of the split member is fitted through the bearing aperture 6a of the arm 6 of the safety spacer and is pressed against part 4, to which it is fastened by a resilient lock 3b, in which case the rear of parts 3, 4 forms a circular flange 4b having a shoulder. The fastening lugs 1, 2 are fastened together by means of the screw 5. The flange 4b is placed in the groove 1a, and the aperture 2a of the fastening lugs is mounted on some tube in the bicycle. The screw 5 is tightened slightly. Thereafter the arm 6 is pivoted in relation to the above-mentioned tube and is swiveled in relation to the flange 4b, in such a say that the arm 6 settles in a horizontal position and the plane of the reflector settles in a vertical position. Thereafter, the screw 5 is tightened completely.

The embodiment described above shows that only one screw is required for fastening all the parts of the safety spacer to a bicycle.

One embodiment according to the invention allows the arm 6 to be pivoted on the shaft 3a to several different fixed positions. This is made possible by the shape of the opposite end of the arm, i.e. its polygonal, preferably hexagonal, shape (FIG. 4). The resulting plurality of side planes 7a are illustrated in FIG 3. The particular plane 7a which corresponds to a given position of arm 6 rests against the rear surface 8 of the inner part of the split member 3, 4. Momentum to the arm 6 is resisted by its corners 7, which are preferably narrower 6b than the bearing part. When the arm 6 is made from a resilient compressible material, such as plastic, the corners 7 yield when the arm 6 is pivoted. As the arm 6 is pivoted from one position to the next, the corresponding side planes 7a are engaged with surface 8. Thus the number of fixed positions is a function of the number of sides on the polygonal shape formed on the end of the arm.

What is claimed is:

1. A bicycle reflector comprising:
   an arm;
   a reflector at one end of the arm;
   a pivot shaft, which is substantially plane parallel with the reflector, at the opposite end of the arm;
   a split member comprising two parts adapted to receive the end of the arm opposite said reflector, at least one part having an aperture or depression for receiving the pivot shaft, and wherein said parts when assembled comprise an annular groove; and
   a splittable fastening means comprising two fastening lugs forming therebetween a cavity, said cavity comprising a radially inwardly projecting annular ridge for rotatably engaging with the annular groove of the split member.

2. The bicycle reflector according to claim 1, further comprising an aperture at the end of the arm opposite said reflector for mounting the pivot shaft.

3. The bicycle reflector according to claim 2, wherein said parts of the split member are shaped in such a way that one part has a pivot shaft and the other part has an aperture or depression for receiving the pivot shaft.

4. The bicycle reflector according to claim 3, further comprising a resilient lock at the end of the pivot shaft, wherein one part of the split member has an aperture or depression having a shoulder, wherein the lock, when snapping over said shoulder, is adapted to lock the parts, and wherein the end of the arm opposite said reflector, through which the pivot shaft has been fitted, is pivotably attached between the shafts.

5. The bicycle reflector according to claim 1, wherein the arm is made of a resilient material, and wherein the end of the arm opposite said reflector has a polygonal shape and its side plane forms a contact surface with the rear surface of the inner part of the split member, so that the arm can be locked in several different fixed positions.

* * * * *